(12) United States Patent
Lindner

(10) Patent No.: US 6,897,375 B2
(45) Date of Patent: May 24, 2005

(54) PROTECTIVE DEVICE FOR ELONGATED OBJECTS

(75) Inventor: Michael Lindner, Rosenheim (DE)

(73) Assignee: FFA Automotive AG, Rebstein (CH)

( * ) Notice: Subject to any disclaimer, the term of this patent is extended or adjusted under 35 U.S.C. 154(b) by 0 days.

(21) Appl. No.: 10/756,186

(22) Filed: Jan. 12, 2004

(65) Prior Publication Data

US 2004/0222013 A1 Nov. 11, 2004

(30) Foreign Application Priority Data

Jan. 13, 2003 (DE) .......................... 103 00 921

(51) Int. Cl.$^7$ ................................. H02G 3/04
(52) U.S. Cl. ................ 174/48; 174/36; 174/102 D; 174/47; 138/121
(58) Field of Search ................. 174/36, 102 D, 174/48, 47, 135; 156/143; 138/121, 122

(56) References Cited

U.S. PATENT DOCUMENTS

| | | | |
|---|---|---|---|
| 2,884,957 A | 5/1959 | Harris et al. | |
| 5,256,233 A | * 10/1993 | Winter et al. | .......... 156/244.13 |
| 6,131,614 A | 10/2000 | Eastham et al. | |
| 2001/0020539 A1 | 9/2001 | Adachi | |
| 2002/0074152 A1 | 6/2002 | Rockney et al. | |

FOREIGN PATENT DOCUMENTS

| | | |
|---|---|---|
| DE | 91 07 484.3 | 8/1991 |
| DE | 697 04 076 | 7/2001 |
| GB | 2 184 512 | 6/1987 |
| WO | WO 97/2931 | 8/1997 |
| WO | WO 98/30830 | 7/1998 |
| WO | WO 99/04194 | 1/1999 |
| WO | WO 99/50943 | 10/1999 |
| WO | WO 01/84685 | 11/2001 |

* cited by examiner

Primary Examiner—Dhiru R. Patel
(74) Attorney, Agent, or Firm—Pauley Petersen & Erickson

(57) ABSTRACT

The invention relates to a protective device for elongated objects, and in particular a protective device for electrical wiring, fluid lines and the like in motor vehicles, having a corrugated tube (1) for receiving the elongated object, a textile layer (3) arranged on the exterior of the corrugated tube (1), as well as a metallic layer (5) arranged on the outside of the textile layer (3).

17 Claims, 1 Drawing Sheet

PROTECTIVE DEVICE FOR ELONGATED OBJECTS

BACKGROUND OF THE INVENTION

1. Field of the Invention

The invention relates to a protective device for elongated objects, and in particular to a protective device for electrical wiring, fluid lines and the like in motor vehicles.

2. Description of Related Art

A heat-protection device for elongated bodies which are exposed to heat in zones, for example for wiring in a motor vehicle, is known from WO 01/84685, which has at least a first interior heat-resistant protective layer facing the body, as well as means which carry off the heat created in the zones and distribute it over large areas.

A heat-protection element for the protection of elongated objects is disclosed in WO 99/04194, wherein the element has a first layer of an insulating material with an outer reflecting layer. Facing edges of the first layer have elements for connecting them overlappingly for forming a tube-like element. A second insulating web is arranged at the outer surface inside the edges. The second web also has a reflecting layer on its outer surface and is fastened to the first web or layer along the edges, so that air pockets are formed between the webs. A rigid monofilament wire provided in spirals is arranged inside this air pocket for further assuring the pocket-like construction. This known device is disadvantageous because it is very complicated to produce and easily loses its shape under mechanical stress.

An insulating arrangement for the insulation of heat-generating components, such as exhaust gas return lines, is known from WO 98/30830, which includes an outer layer of knit glass filament yarn. A metal wire skeleton is provided for giving the layer a tube-like shape, wherein a further layer made of a heat-insulating mineral paper is provided, which is separated from the cover layer by the metal wires. This arrangement is also disadvantageous because it is very complicated to produce.

An insulating layer for the thermal insulation of tube-like heat sources is known from WO 97/29316, wherein knit separating layers are provided, between which a metallic foil is arranged and is separated from a heat source by a knit layer. The structure of this layer includes a foil resting against the heat source, on top of it an inner knit stainless steel fiber layer, on top of that a fire-resistant paper, a second knit layer of a stainless steel fiber, and a cover layer on top of it. The complicated production of this embodiment is also disadvantageous.

It is known to enclose long or elongated bodies, for example electrical wiring or fluid lines, such as hydraulic or pneumatic lines, or pneumatic hoses, in plastic corrugated tubes as a protection against mechanical and/or thermal effects, in particular as a protection against heat and wear by abrasion. It is furthermore known to appropriately protect such elongated bodies against damage in case of an accident of the vehicle, in particular damage by squeezing or shearing.

Customary corrugated tubes are made of polypropylene or polyamide and can withstand thermal stress only to a limited degree. Consequently, such corrugated tubes do not sufficiently protect electrical wiring, hoses, or the like, which are located in vehicles near heat sources, for example near the engine, a turbo-charger, an exhaust system, exhaust gas return lines or the like, against damaging heat.

To solve this problem it is known to use highly temperature-resistant corrugated tubes made, for example, of Teflon™, or to make the insulation of the conducting wires from a highly temperature-resistant material, for example a silicon or Teflon™ material. However, such highly temperature-resistant cable insulations are very expensive. It is also known to provide glass filament hoses with a silicon sheathing.

It is furthermore known to arrange corrugated tubes of poly(tetrafluoroethylene) around cable harnesses in areas subjected to heat. However, this arrangement is disadvantageous in that a permanent heat resistance of these poly(tetrafluoroethylene) corrugated tubes is only assured up to approximately 260° C., wherein the melting point lies at 310° C., so that dammed-up heat, which often lies above 300° C., cannot be managed.

It is moreover known to laminate glass filament hoses with an aluminum foil for increasing the thermal resistance of the fiberglass hoses. However, it was noted that with the soiling of the aluminum foil resting on the glass filament hoses, which is customary in engine compartments, thermal insulation no longer exists and heat is introduced in spots into the glass filament hoses, which in these areas leads to an undesired heat transfer to the object to be protected. Furthermore, glass filament hoses coated in this way, or the coatings themselves, are very much prone to damage caused by abrasive stresses.

SUMMARY OF THE INVENTION

It is an object of the invention to provide a protective device for elongated objects which, along with a high degree of stability and impact resistance, provides a sufficient thermal insulation and also has sufficient abrasive resistance.

In accordance with the invention, a glass filament hose is wound or knit around a corrugated tube, or the latter is coated with such a glass filament hose, wherein the glass filament hose is connected in partial areas with the corrugated tube, for example with an adhesive. An aluminum layer, in particular a lamination of aluminum foil, is applied to the exterior of the glass filament hose. It has now been surprisingly shown that the advantages of the corrugated tube, namely flexural strength, low tendency to buckling and a high degree of impact resistance, are completely retained by this construction, so that a very good thermal insulation, or a very good thermal protection, of the corrugated tube is achieved. Moreover, a high degree of abrasion protection is achieved by the arrangement in accordance with the invention, wherein the outer aluminum layer which per se is very sensitive, greatly resists abrasive stresses. It was furthermore surprisingly found that the corrugated tube is not negatively affected even if the aluminum layer is soiled. This is attributed to a thermal interaction between the aluminum foil and the glass filament hose, on the one hand, and, on the other hand, to an air cushion formed by the corrugated tube.

In comparison with a glass filament hose which has been laminated with aluminum, the arrangement in accordance with the invention is able to achieve a temperature reduction from the outside toward the interior which is greater by approximately 40 to 50% than that of known protective devices. The heat insulation, or heat shielding output is so great that, in the areas subjected to heat, it is possible to omit the use of electrical conduits provided with a temperature-resistant insulation, so that commercially available PVC-insulated conduits can be used instead.

It is moreover advantageous that the individual components of the protective device are practical and can also be assembled in a simple, quick and dependable manner.

BRIEF DESCRIPTION OF THE DRAWING

The invention will be explained by way of example by means of the drawing.

DESCRIPTION OF PREFERRED EMBODIMENTS

Figure 1:
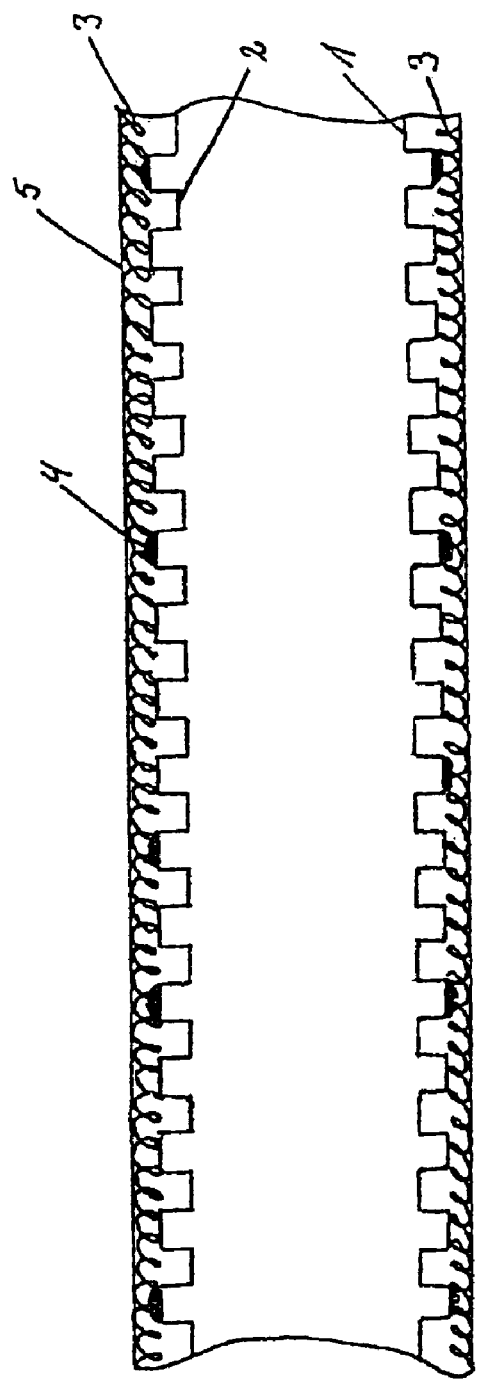
FIG. 1 shows a protective device for elongated objects in accordance with the invention in longitudinal cross section.

A protective device for elongated objects in accordance with the invention includes an elongated cylindrical corrugated tube 1. Corrugated tubes 1 of this type are provided with constrictions 2 at regular intervals in such a way that on the outside in the longitudinal direction a ribbed structure including radial ribs results. The corrugated tube 1 may include such materials as, for example, polyolefin, polypropylene, polyamide, polyamide-6, polyester, aramide, polytetrafluoroethylene (PTFE) or other plastic materials, plastic laminates, armored plastic or plastic laminates, or possibly metal, such as aluminum. The corrugated tube 1 is used for receiving an elongated object, such as, in particular, electrical conduits, fluid lines and the like, in motor vehicles.

A textile layer 3 is arranged around the outside of the corrugated tube 1. The textile layer 3 may include a braided, knit, non-woven, and/or woven textile material, which can also be placed around the corrugated tube 1 in strips or in the form of mats, in particular of knit or braided glass filaments. For fixing the textile layer 3 on the corrugated tube 1, an adhesive, in particular in the shape of dabs 4 of adhesive or in the form of a convolution or a helix of adhesive, can be provided in regular or irregular spacing on the corrugated tube 1. In this case the distance between the adhesive dabs 4 can be selected to be such that, between the adhesive dabs 4, the textile layer 3 is capable of reducing tensions applied from the outside during position changes. The textile layer 3 may be made of knit glass filaments. It is moreover possible to use polyester, polyamide, aramide, polytetrafluoroethylene (PTFE), and other possible fibers in place of knit glass filaments. Furthermore monofilaments, as well as multifilaments, can be used, wherein it is intended to absorb a temperature of 400° C. When using glass filaments, the most varied types of glass can be used, but the so-called E-glass is preferred.

In accordance with the invention, the textile layer 3 can furthermore be conditioned with any type of impregnations, for example silicon oil or the like. Moreover, the fibers or filaments constituting the textile layer 3 can also be provided individually with coatings or a sheath, for example for reducing friction, for increasing their reflecting capabilities or surface quality, and the like. Examples of suitable sheath or coating materials include plastic, wax, fluid, oil, and metal. In particular, the fibers can be provided with a vapor-deposited metal layer.

The protective device for elongated objects in accordance with the invention furthermore has an outer layer 5, suitably made of a metal foil, on its exterior. Basically every metallic foil material can be used as the material for the metal foil. It is furthermore possible to use a laminated foil including several metallic layers, possibly also of different metals, if an increased reflective behavior is required. The outer layer 5 is suitably made of an aluminum foil, in particular an aluminum foil with a highly glossy surface, whose thickness is, for example, 20 µm to 30 µm.

In one embodiment, the outer layer 5 is designed as a PET foil, with a metal layer, such as aluminum, vapor-deposited on the outer layer 5. This embodiment has a particularly great abrasion and tear resistance. In this embodiment the vapor-deposited layer is arranged facing outward.

In another embodiment, the outer layer 5 can include one or more metal foil webs, which are wound on the textile layer 3 in the form of convolutions or helixes. The metal foil webs may overlap themselves and/or one another on the textile layer 3. Additionally, the foil webs may be wound on the textile layer 3 in such a way that a double- or multi-layered structure of the metal foil is formed by the overlap. The foil webs may each include several layers of foils of one or several metals placed on top of each other.

For applying the textile layer 3, such as a knitted layer, on the corrugated tube 1, the textile layer 3 can be knit continuously around the corrugated tube 1 in a suitable circular knitting machine, wherein adhesive is applied in dabs or over surfaces to the corrugated tube 1 prior to the knitting process, so that the knitted-on material is glued to the corrugated tube 1. Subsequently the foil is wound around the textile layer 3 wherein, as a function of the gradient in the course of the windings of the foil, different overlapping widths of the foil on the layer underneath it can be realized, up to a multi-layered foil.

It is also possible to draw a textile hose onto the corrugated tube 1 and to fix their ends together.

It is moreover possible to vapor-deposit and/or galvanize one or more metallic layers on the textile layer in place of a foil.

What is claimed is:

1. A protective device for elongated objects, comprising:
   a corrugated tube for receiving an elongated object;
   a textile layer arranged on an exterior of the corrugated tube; and
   a metallic layer arranged radially outside of the textile layer;
   wherein the textile layer comprises a glass filament hose.

2. The device in accordance with claim 1, wherein the corrugated tube comprises at least one of the group consisting of: polyamide, polyolefin, polyester, aramide, other plastic materials, plastic laminates, armored plastic or plastic laminates, metal, and combinations thereof.

3. The device in accordance with claim 1, wherein the textile layer comprises a braided, knit, non-woven or woven hose.

4. The device in accordance with claim 1, wherein the textile layer comprises a monofilament or a multifilament.

5. The device in accordance with claim 1, wherein the textile layer is glued onto the corrugated tube.

6. The device in accordance with claim 5, further comprising an adhesive between the corrugated tube and the textile layer for gluing the textile layer onto the corrugated tube.

7. The device in accordance with claim 6, wherein the adhesive is present in the form of a convolution or a helix on the surface of the corrugated tube.

8. The device in accordance with claim 1, wherein the textile layer comprises a coated or sheathed filament.

9. The device in accordance with claim 8, wherein the filament is coated with or sheathed in at least one of the group consisting of plastic, wax, a fluid, oil, and a metal.

10. The device in accordance with claim 8, wherein a metal is vapor-deposited on the filament.

11. The device in accordance with claim 1, wherein the outer metallic layer comprises at least one metal foil web, which is wound on the textile layer in the form of a convolution or a helix.

12. The device in accordance with claim 11, wherein the at least one foil web is overlappingly wound on the textile layer.

13. The device in accordance with claim 12, wherein the at least one foil web is wound on the textile layer in such a way that a double- or multi-layered structure of the metal foil is formed by the overlap.

14. The device in accordance with claim 11, wherein the at least one metal foil web comprises several layers of foils of at least one metal placed on top of each other.

15. The device in accordance with claim 1, wherein the outer metallic layer comprises at least one of the group consisting of at least one metal vapor deposit, at least one galvanized metal layer, and combinations thereof, arranged on a substrate.

16. The device in accordance with claim 1, wherein the outer metallic layer comprises a polyethylene terephthalate foil, on which a metal has been vapor-deposited.

17. The device in accordance with claim 16, wherein the metal that has been vapor-deposited on the polyethylene terephthalate foil comprises aluminum.

* * * * *